United States Patent
Tiwari

(10) Patent No.: US 11,263,366 B2
(45) Date of Patent: Mar. 1, 2022

(54) METHODS AND SYSTEMS FOR IMPROVING AN INTERIOR DESIGN OF A VEHICLE UNDER DEVELOPMENT

(71) Applicant: Toyota Motor Engineering & Manufacturing North America, Inc., Plano, TX (US)

(72) Inventor: Prashant Tiwari, Santa Clara, CA (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 343 days.

(21) Appl. No.: 16/532,759

(22) Filed: Aug. 6, 2019

(65) Prior Publication Data
US 2021/0042396 A1 Feb. 11, 2021

(51) Int. Cl.
*G06F 30/15* (2020.01)
*G06Q 30/02* (2012.01)
*G06Q 50/30* (2012.01)
*G06F 111/20* (2020.01)

(52) U.S. Cl.
CPC ......... *G06F 30/15* (2020.01); *G06Q 30/0282* (2013.01); *G06Q 50/30* (2013.01); *G06F 2111/20* (2020.01)

(58) Field of Classification Search
CPC .. G06F 30/15; G06F 2111/20; G06F 2111/16; G06Q 30/0282; G06Q 50/30
USPC .................................................. 296/193.04
See application file for complete search history.

(56) References Cited

U.S. PATENT DOCUMENTS

| | | |
|---|---|---|
| 10,026,237 B1 | 7/2018 | Fields et al. |
| 2013/0246301 A1 | 9/2013 | Radhakrishnan et al. |
| 2016/0364678 A1 | 12/2016 | Cao |
| 2017/0161386 A1 | 6/2017 | Mitsui et al. |
| 2017/0327082 A1* | 11/2017 | Kamhi ................. B60R 25/102 |
| 2018/0089605 A1 | 3/2018 | Poornachandran et al. |
| 2018/0349831 A1* | 12/2018 | Harris ................... G06Q 30/08 |
| 2019/0039500 A1 | 2/2019 | Gurin et al. |

(Continued)

FOREIGN PATENT DOCUMENTS

EP 3075591 B1 10/2016
WO WO-2018035484 A1 * 2/2018 ......... B60R 16/0373

OTHER PUBLICATIONS

Hog Ring, Survey Highlights In-Demand Car Features, 2015 (Year: 2015).*

(Continued)

*Primary Examiner* — Tarek Elchanti
(74) *Attorney, Agent, or Firm* — Christopher G. Darrow; Darrow Mustafa PC

(57) ABSTRACT

Systems and methods described herein concern improving an interior design of a vehicle under development. One embodiment presents an electronic survey to ridesharing customers from a plurality of ridesharing trips in a rideshare vehicle having a reconfigurable interior that is configured in accordance with a proposed interior design for the vehicle under development, the electronic survey pertaining to one or more features of the proposed interior design, and collects and stores, in a computer memory, responses to the electronic survey for the plurality of ridesharing trips. The proposed interior design is modified based, at least in part, on the responses to the electronic survey.

20 Claims, 7 Drawing Sheets

(56) References Cited

U.S. PATENT DOCUMENTS

2019/0066535 A1   2/2019   Pifko et al.

OTHER PUBLICATIONS

Hawkins, "Uber Is Going to Turn Your Smartphone Into an Automatic Crash Detector," Sep. 5, 2018, found at https://www.theverge.com/2018/9/5/17823120/uber-rider-check-safety-crash-detector-dara-khosrowshahi.

"Elevating the Ridesharing Experience," McKinsey & Company and Lunar, 2017, found at https://mobility.lunar.com/.

Winter, "Magna Unveils Flexible Interior for Autonomous Vehicles," Dec. 11, 2018, found at https://www.wardsauto.com/autonomous-vehicles/magna-unveils-flexible-interior-autonomous-vehicles.

* cited by examiner

METHODS AND SYSTEMS FOR IMPROVING AN INTERIOR DESIGN OF A VEHICLE UNDER DEVELOPMENT

TECHNICAL FIELD

The subject matter described herein relates in general to vehicles and, more specifically, to systems and methods for improving an interior design of a vehicle under development.

BACKGROUND

An important aspect of manufacturing a vehicle is the design of its interior. Features such as the design of the seats and their placement and configuration, legroom, headroom, instrument panels, electronic systems such as audio and video systems, and various user interfaces for vehicle systems can have a significant impact on a consumer's ultimate satisfaction with a vehicle. Particularly for popular vehicle models, manufacturers may want to ensure that a new interior design will be accepted by consumers before the design for a new model year is mass-produced. Gauging consumer acceptance in advance can sometimes be difficult and expensive, especially if market testing involves iteratively modifying prototype vehicles to correct weaknesses in the proposed interior design.

SUMMARY

An example of a system for improving an interior design of a vehicle under development is presented herein. The system comprises one or more processors and a memory communicatively coupled to the one or more processors. The memory stores a survey presentation module including instructions that when executed by the one or more processors cause the one or more processors to present a first survey to ridesharing customers from a first plurality of ridesharing trips in a rideshare vehicle having a reconfigurable interior that is configured in accordance with a first proposed interior design for the vehicle under development, wherein the first survey pertains to one or more features of the first proposed interior design. The memory also stores a data collection module including instructions that when executed by the one or more processors cause the one or more processors to collect and store responses to the first survey for the first plurality of ridesharing trips. The first proposed interior design is modified based, at least in part, on the responses to the first survey.

Another embodiment is a method of improving an interior design of a vehicle under development. The method comprises presenting a first electronic survey to ridesharing customers from a first plurality of ridesharing trips in a rideshare vehicle having a reconfigurable interior that is configured in accordance with a first proposed interior design for the vehicle under development, the first electronic survey pertaining to one or more features of the first proposed interior design. The method also includes collecting and storing, in a computer memory, responses to the first electronic survey for the first plurality of ridesharing trips. The first proposed interior design is modified based, at least in part, on the responses to the first electronic survey.

Another embodiment is a system for improving an interior design of a vehicle under development. The system comprises a rideshare vehicle having a reconfigurable interior that is configured in accordance with a first proposed interior design for the vehicle under development, one or more processors, and a memory communicably coupled to the one or more processors. The memory stores a data acquisition module including instructions that when executed by the one or more processors cause the one or more processors to receive responses to a first survey presented to ridesharing customers from a first plurality of ridesharing trips in the rideshare vehicle, the first survey pertaining to one or more features of the first proposed interior design. The memory also stores an interior design module including instructions that when executed by the one or more processors cause the one or more processors to modify the first proposed interior design based, at least in part, on the responses to the first survey.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The embodiments described herein use a rideshare vehicle having a modular, reconfigurable interior as a test platform for improving an interior design of a vehicle under development. In some embodiments, the vehicle under development is distinct from the rideshare vehicle. In some embodiments, the rideshare vehicle may be one used in connection with a ridesharing service such as Uber or Lyft. One example of a vehicle having a modular, reconfigurable interior that can be used as a rideshare vehicle is Toyota's e-Palette. In other embodiments, a different kind of rideshare vehicle having a reconfigurable interior can be used. In general, the rideshare vehicle is designed in a manner that makes its interior highly modular and reconfigurable with respect to seating, door panels, instrument panels, legroom, headroom, user-interface features, audio and video systems, etc.

In one embodiment, once the interior of a rideshare vehicle has been configured in accordance with a proposed interior design for a vehicle under development, ridesharing customers using the rideshare vehicle are presented with a survey during or at the conclusion of a ride to gauge their satisfaction with specific features of the proposed interior design (e.g., seat comfort, legroom, headroom, audio system, etc.). The responses to the survey are collected and stored. A vehicle manufacturer may decide to modify the proposed interior design for the vehicle under development based, at least in part, on the responses to the survey. In some embodiments, a ridesharing company deploys a fleet of rideshare vehicles having a reconfigurable interior, making possible the simultaneous testing of multiple proposed interior designs for one or more vehicle models under development.

The embodiments described herein provide an efficient way for a vehicle manufacturer to improve an interior design of a vehicle under development. The flexibility of the rideshare vehicle's reconfigurable interior permits different proposed designs for the same vehicle model to be compared under real-world conditions with a large population of ridesharing customers. For example, in one embodiment, a survey is presented to ridesharing customers when the rideshare vehicle's interior is configured in accordance with a proposed interior design ("Design A") for a vehicle under development. Another survey is presented to ridesharing customers when the rideshare vehicle's interior or that of a different rideshare vehicle is configured in accordance with a different proposed interior design ("Design B") for the same vehicle under development. The responses to the survey for Design A can then be compared with the responses to the survey for Design B, and an improved interior design can be created based, at least in part, on the comparison.

Figure 1:
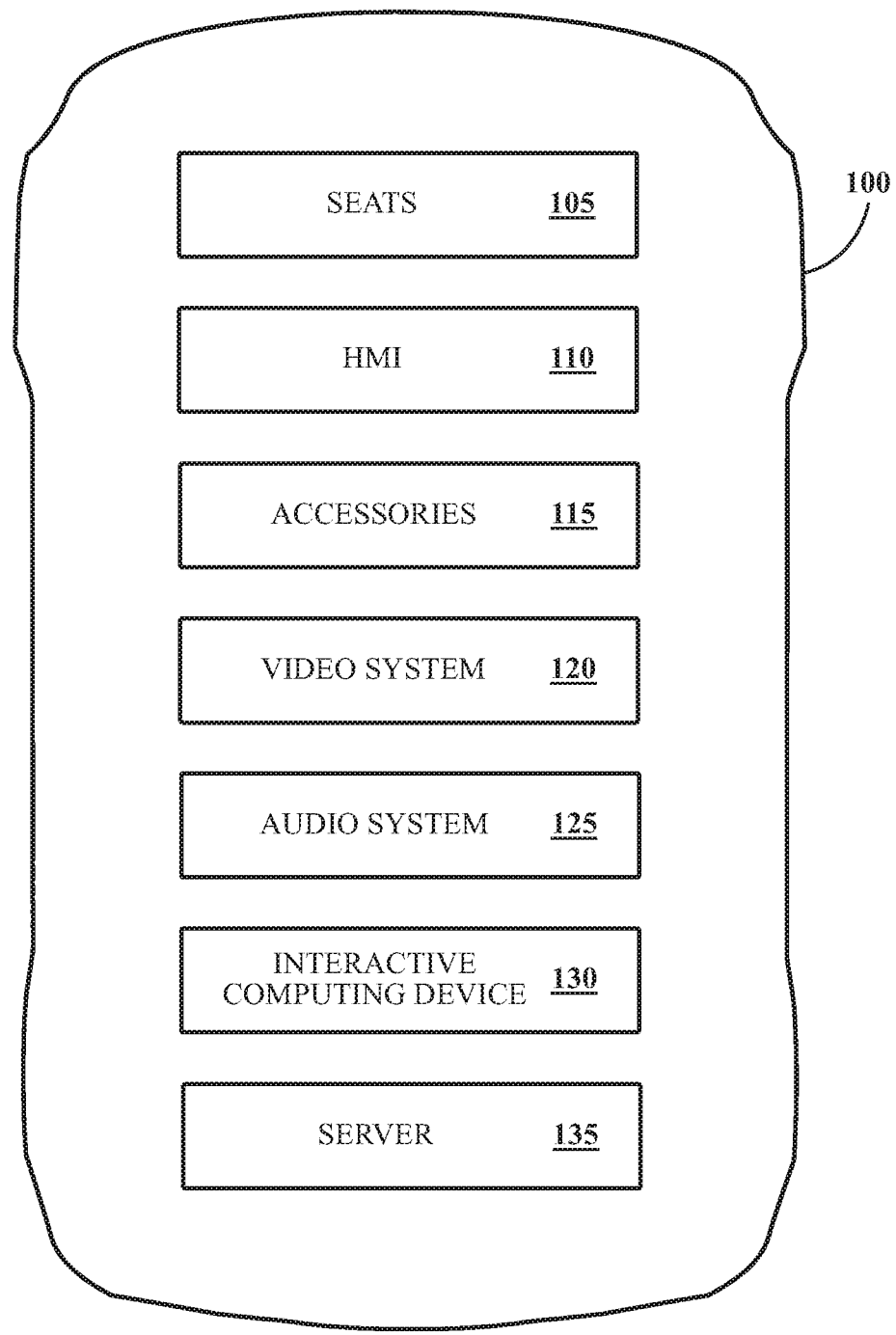
FIG. 1 illustrates one embodiment of a rideshare vehicle within which certain aspects of systems and methods disclosed herein may be implemented.

Referring to FIG. 1, an example of a rideshare vehicle 100 is illustrated. As used herein, a "vehicle" is any form of motorized transport. In one or more implementations, the rideshare vehicle 100 is an automobile. While arrangements will be described herein with respect to automobiles, it will be understood that embodiments are not limited to automobiles. In some implementations, the rideshare vehicle 100 may be any other form of motorized transport on land, water, or in the air. In some embodiments, rideshare vehicle 100 is driven manually by a human driver. In other embodiments, rideshare vehicle 100 is driven autonomously or semi-autonomously. As used herein, a "rideshare vehicle" refers to a vehicle that is used in connection with an arrangement between a vehicle owner and a person who enters a pickup location and destination through an app or Web site for a fee. Examples of ridesharing services include Uber and Lyft.

The rideshare vehicle 100 also includes various elements. It will be understood that rideshare vehicle 100 can have other elements in addition to those shown in FIG. 1. Many common vehicle components (engine, transmission, wheels, navigation system, etc.) are not shown in FIG. 1 for simplicity. Some of the possible elements of rideshare vehicle 100 pertaining to the embodiments described herein are shown in FIG. 1 and will be described in greater detail in connection with subsequent figures. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

First, it should noted that rideshare vehicle 100 is designed to be highly modular and reconfigurable with respect to seating, door panels, instrument panels, legroom, headroom, user-interface features, audio and video systems, etc. These subsystems are modular in the sense that they can be easily removed and replaced by different subsystems. This makes it possible to configure the interior of rideshare vehicle 100 in accordance with a variety of different proposed interior designs for vehicles under development.

The rideshare vehicle 100 includes one or more seats 105. Some important interior-design characteristics are associated with seats, such as the material with which they are upholstered (e.g., cloth, plastic, leather, etc.), the back and bottom cushions within the seats, how they recline or otherwise adjust, the design and adjustability of the headrests, and the kind of lumbar support they provide. The comfort of seats 105 is particularly important for long rides.

The rideshare vehicle 100 also includes a human-machine interface (HMI) 110 for controlling various vehicle systems such as a lighting system; a heating, ventilation, and air-conditioning (HVAC) system; and a navigation system. Conceptually, HMI 110 may be thought of as a collection of separate user interfaces for controlling various vehicle systems and features.

The rideshare vehicle 100 also includes accessories 115, a broad category of interior features that includes, e.g., mirrors, cup holders, window visors, seat covers, window tint, floor mats, etc. Two special types of vehicle accessories are video system 120 and audio system 125, which may be integrated with each other, in some embodiments. Audio systems can vary, for example, in the types of speakers employed and their placement within the passenger compartment. Video systems can vary, for example, in the size and resolution of their displays.

In some embodiments, rideshare vehicle 100 includes an interactive computing device 130 for presenting surveys to ridesharing customers. In one embodiment, interactive computing device 130 is a touchscreen-based tablet computer mounted somewhere in rideshare vehicle 100 where a ridesharing customer can access it. Such an interactive computing device 130 may communicate with other in-vehicle systems, with one or more remote servers, or both, as discussed further below. In some embodiments, interactive computing device 130 may host a server.

In some embodiments, rideshare vehicle 100 includes a server 135 for collecting and storing survey responses from ridesharing customers. In other embodiments, rideshare vehicle 100 does not include server 135. Instead, ridesharing customers receive and respond to post-ride surveys by communicating with one or more remote servers using a mobile device such as a smartphone. In some embodiments, interactive computing device 130 in rideshare vehicle 100 communicates with one or more remote servers. As just mentioned above, in still other embodiments, interactive computing device 130 may host an in-vehicle server. These various embodiments are discussed more fully below.

As discussed above, the interior of rideshare vehicle 100 is modular and reconfigurable so that the interior of rideshare vehicle 100 can be configured in accordance with a variety of different proposed interior designs corresponding to vehicles under development. For example, at one time the interior of rideshare vehicle 100 might be configured in accordance with a proposed interior design for a Toyota Camry for a future model year. At different time, the interior of rideshare vehicle 100 might be configured in accordance with a proposed interior design for a Toyota Avalon for a future model year. In some embodiments, the interior of rideshare vehicle 100 is reconfigured manually by one or more human workers. In other embodiments, at least some degree of automation (e.g., robotics or specialized mechanisms) is employed in reconfiguring the interior of rideshare vehicle 100.

In other embodiments, the interior of rideshare vehicle 100 can be configured differently at different times to compare customer reactions to two different proposed interior designs for the same vehicle model under development, such as the example involving "Design A" and "Design B" discussed above. This process, of course, can be generalized to a comparison of more than two different proposed interior designs for a particular vehicle under development.

Figure 2:
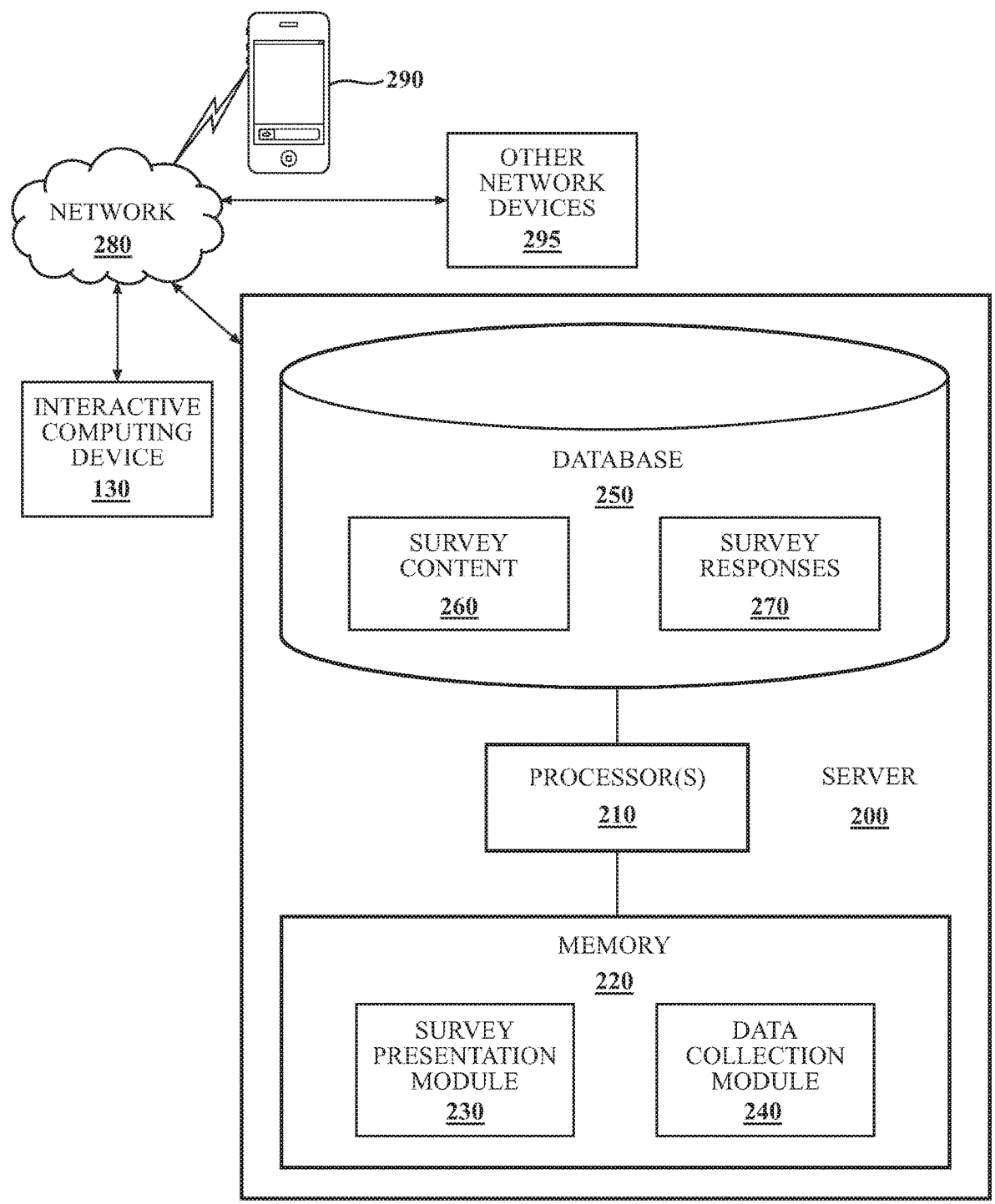
FIG. 2 illustrates one embodiment of a server.

With reference to FIG. 2, one embodiment of a server 200 is illustrated. Depending on the particular embodiment, server 200 may be located remotely from rideshare vehicle 100. In other embodiments, server 200 may coincide with server 135 in FIG. 1 (i.e., server 200, in those embodiments, is integrated with rideshare vehicle 100).

In some embodiments, server 200 is associated with a ridesharing company that, under an arrangement with a vehicle manufacturer, collects survey responses from its ridesharing customers so the vehicle manufacturer can gauge consumer reactions to a proposed interior design for a vehicle under development. Under the terms of such an arrangement, the ridesharing company can share collected survey-response data with the vehicle manufacturer, and the vehicle manufacturer can improve the proposed interior design based, at least in part, on the survey responses. In some embodiments, the vehicle manufacturer provides rideshare vehicles having a reconfigurable interior like rideshare vehicle 100 at a discount in exchange for the ridesharing company administering the surveys to its customers and compiling and forwarding the survey-response data to the vehicle manufacturer.

A variety of different business arrangements between the ridesharing company and the vehicle manufacturer are possible. For example, the ridesharing company might be a subsidiary of the vehicle manufacturer, or the vehicle manufacturer might be an investor in or business partner with the ridesharing company.

Server 200 includes one or more processors 210 communicably coupled with a memory 220. In this embodiment, memory 220 stores a survey presentation module 230 and a data collection module 240. The memory 220 is a random-access memory (RAM), read-only memory (ROM), flash memory, or other suitable memory for storing the modules 230 and 240. The modules 230 and 240 are, for example, computer-readable instructions that when executed by the one or more processors 210 cause the one or more processors 210 to perform the various functions disclosed herein.

Survey presentation module 230 generally includes instructions that cause the one or more processors 210 to present, to ridesharing customers, surveys pertaining to the features of proposed interior designs for vehicles under development. As mentioned above, in some embodiments, the vehicle under development is distinct from the rideshare vehicle 100. For example, in one embodiment, while the reconfigurable interior of rideshare vehicle 100 is configured in accordance with a proposed interior design for a vehicle under development, survey presentation module 230 presents a survey to ridesharing customers from a plurality of ridesharing trips in rideshare vehicle 100. For example, survey presentation module 230 might, during the course of a week, present a survey directed to a particular proposed interior design to 1000 ridesharing customers. In some embodiments, the ridesharing customers receive an incentive (discounted ride fares, loyalty points, etc.) in exchange for being willing to complete surveys pertaining to proposed interior designs of vehicles under development. In some embodiments, the ridesharing customers are made aware (e.g., as part of the survey content) that they are assisting a vehicle manufacturer by completing the surveys.

In some embodiments, survey presentation module 230 facilitates the comparison of survey responses for two different proposed interior designs for the same vehicle under development. In those embodiments, after the reconfigurable interior of rideshare vehicle 100 has been reconfigured in accordance with a different proposed interior design, survey presentation module 230 presents a corresponding survey to another plurality of ridesharing customers making use of rideshare vehicle 100. For example, survey presentation module 230 might, during the course of another week, present a survey directed to the different proposed interior design to another 1000 ridesharing customers. As discussed above, this process can be generalized to support comparisons among the survey responses for more than two proposed interior designs for a given vehicle under development.

As depicted in FIG. 2, the survey content 260 can be stored in and retrieved from a database 250. In some embodiments, a given survey includes a plurality of questions specifically tailored to gauge customer satisfaction with one or more features of the proposed interior design to which it pertains. For example, the questions can, without limitation, pertain to features such as seat characteristics, legroom, headroom, HMI features, accessories, video-system features, and audio-system features.

In some embodiments, survey presentation module 230 transmits electronic surveys to the ridesharing customers' mobile devices (e.g., smartphones). In those embodiments, presenting surveys pertaining to proposed interior designs of vehicles under development can be an aspect of the same ridesharing app that ridesharing customers use to hail rides, pay for their rides, etc. In other embodiments, survey presentation module 230 transmits the electronic surveys to an interactive computing device 130 in rideshare vehicle 100, and interactive computing device 130 displays the surveys to ridesharing customers. In those embodiments, ridesharing customers can respond to a survey using a touchscreen or other user interface that is part of interactive computing device 130. In still other embodiments in which rideshare vehicle 100 includes an integrated server 135 (e.g., coinciding with server 200), server 135 may be hosted on interactive computing device 130. In such an embodiment, server 135 may not need to function as a server but may instead operate as a standalone computer or client computer in rideshare vehicle 100. As indicated in FIG. 2, survey presentation module 230 can communicate with a mobile device 290 or with interactive computing device 130 via a network 280. Network 280 can include wired network connections, wireless network connections, or both and can include the Internet.

Data collection module 240 generally includes instructions that cause the one or more processors 210 to collect and store responses to electronic surveys pertaining to proposed interior designs for vehicles under development. As indicated in FIG. 2, data collection module 240 can store collected survey responses 270 in a database 250. In some embodiments, data collection module 240 can store survey responses 270 for a plurality of different surveys corresponding to different proposed interior designs for the same vehicle under development to facilitate comparisons of survey results among the different proposed interior designs.

In those embodiments, data collection module 240 can collect and store responses to a survey for a plurality of ridesharing trips taken by customers while the reconfigurable interior of rideshare vehicle 100 is configured in accordance with a corresponding proposed interior design, and that process can be repeated as the interior of rideshare vehicle 100 is reconfigured for different proposed interior designs.

When necessary, data collection module 240 can transmit survey responses 270 to other network devices 295 via network 280. For example, in some embodiments, server 200 forwards survey responses 270 to a server or other computer associated with a vehicle manufacturer to permit the vehicle manufacturer to analyze the survey responses 270 and make any desired changes to the proposed interior designs for the vehicles under development. This is discussed further in connection with FIG. 3 below.

Figure 3:
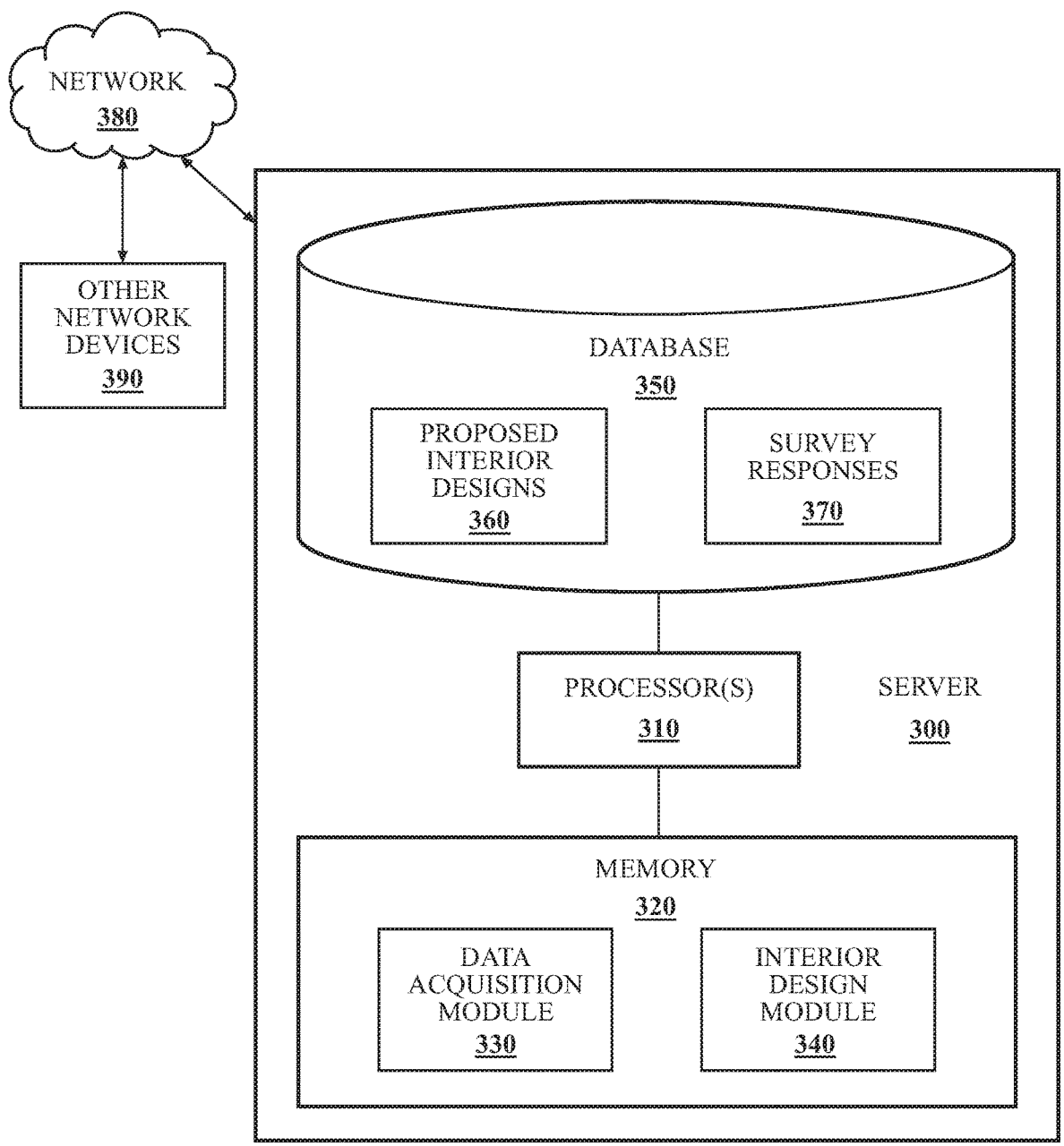
FIG. 3 illustrates another embodiment of a server.

With reference to FIG. 3, one embodiment of a server 300 is illustrated. Server 300 includes one or more processors 310 and a memory 320 communicably coupled with the one or more processors 310. In this embodiment, memory 320 stores a data acquisition module 330 and an interior design module 340. The memory 320 is a random-access memory (RAM), read-only memory (ROM), hard-disk drive, flash memory, or other suitable memory for storing the modules 330 and 340. The modules 330 and 340 are, for example, computer-readable instructions that when executed by the one or more processors 310 cause the one or more processors 310 to perform the various functions disclosed herein.

In some embodiments, server 300 is associated with a vehicle manufacturer that has one of the kinds of arrangements with a ridesharing company discussed above in connection with FIG. 2. Such a vehicle manufacturer has proposed interior designs 360 for one or more vehicles under development by the vehicle manufacturer. Those proposed interior designs 360 can be stored in a database 350.

Data acquisition module 330 generally includes instructions that cause the one or more processors 310 to receive responses to surveys pertaining to the proposed interior designs 360 for vehicles under development. As mentioned above, in some embodiments, the vehicle under development is distinct from the rideshare vehicle 100. In one embodiment, the reconfigurable interior of rideshare vehicle 100 is configured in accordance with a proposed interior design for a vehicle under development, and the configuring is performed by the vehicle manufacturer or an agent of the vehicle manufacturer. In this embodiment, data acquisition module 330 receives responses to a survey presented to ridesharing customers from a plurality of ridesharing trips in the rideshare vehicle 100. The survey pertains to one or more features of the proposed interior design, as discussed above. The survey responses 370 may be received from, e.g., server 200 discussed above in connection with FIG. 2.

In another embodiment, the reconfigurable interior of rideshare vehicle 100 is reconfigured in accordance with a different proposed interior design for the same vehicle under development, and the reconfiguring is performed by the vehicle manufacturer or an agent of the vehicle manufacturer. Data acquisition module 330 receives responses to another survey presented to ridesharing customers from a different plurality of ridesharing trips in the rideshare vehicle 100. In this case, the survey pertains to one or more features of the different proposed interior design. This embodiment facilitates a comparison of survey results corresponding to different interior designs for the same vehicle under development, as discussed further below.

Interior design module 340 generally includes instructions that cause the one or more processors 310 to modify proposed interior designs 360 for vehicles under development based, at least in part, on the survey responses 370. In some embodiments, interior design module 340 is replaced in part or in its entirety by manual analysis and action by one or more human workers. Thus, some embodiments of server 300 do not include interior design module 340. In one embodiment, interior design module 340 modifies a proposed interior design based, at least in part, on the responses of ridesharing customers to an associated survey, as discussed above. In a different embodiment, interior design module 340 compares the responses to two different surveys corresponding to two different proposed interior designs for the same vehicle under development and generates a different proposed interior design for the vehicle under development based, at least in part, on the comparison.

In some cases, a comparison might simply involve choosing one of the two proposed interior designs over the other. For example, a first proposed interior design and a second proposed interior design might differ only in the type and placement of audio speakers. If the responses to the survey for the first proposed interior design are significantly more favorable than those for the second proposed interior design, interior design module 340 can select the first proposed interior design as the preferred interior design, assuming that all other aspects of that design are acceptable, according to the survey responses. In other cases, the comparison might lead interior design module 340 to combine certain features of one interior design with those of another to create a synthesis of the two designs. In still other cases, the comparison might lead interior design module 340 to select a modified version of either the first or the second proposed interior design as a preferred design.

Depending on the particular embodiment, interior design module 340 can modify proposed interior designs based on predetermined heuristics of vehicle interior design, on machine-learning-based techniques, or a combination of these approaches. For example, if a survey indicates that the legroom in a proposed interior design is too small, interior design module 340 can increase the legroom by an increment that is consistent with other design constraints, making whatever adjustments are needed in other aspects of the design.

Server 300 can communicate with other network devices 390 via a network 380 as needed. For example, server 300, specifically data acquisition module 330, can communicate with a server 200 associated with a ridesharing company to obtain survey responses 370. In some embodiments, server 300 might not need to function as a server and may instead function as a standalone computer or a client computer.

Figure 4:
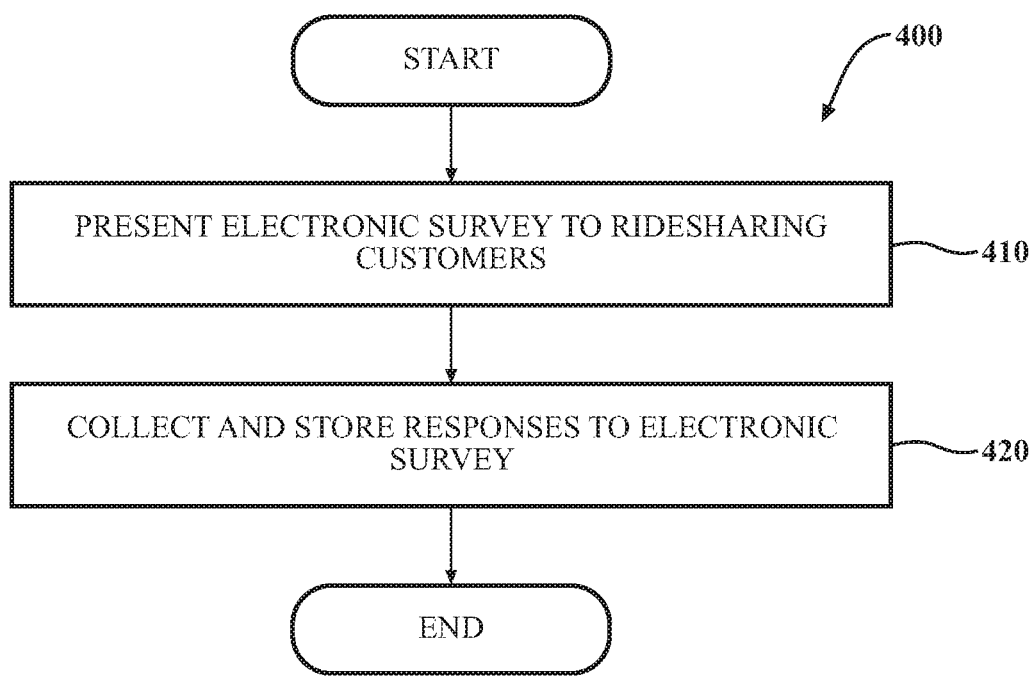
FIG. 4 is a flowchart of a method of improving an interior design of a vehicle under development, in accordance with an illustrative embodiment of the invention.

FIG. 4 is a flowchart of a method 400 of improving an interior design of a vehicle under development, in accordance with an illustrative embodiment of the invention. Method 400 will be discussed from the perspective of server 200 in FIG. 2. While method 400 is discussed in combination with server 200, it should be appreciated that method 400 is not limited to being implemented using server 200, but server 200 is instead one example of a system that may implement method 400.

At block 410, survey presentation module 230 presents an electronic survey to ridesharing customers from a plurality of ridesharing trips in a rideshare vehicle 100 having a reconfigurable interior that is configured in accordance with a proposed interior design for a vehicle under development, as explained above. The presented electronic survey pertains to one or more features of the proposed interior design. As discussed above, in some embodiments, survey presentation module 230 presents the electronic survey by transmitting the electronic survey to mobile devices 290 (e.g., smartphones) associated with the respective ridesharing customers. In a different embodiment, survey presentation module 230 presents the electronic survey by transmitting the electronic survey to an interactive computing device 130 installed in the rideshare vehicle 100, and the survey is displayed to ridesharing customers via the interactive computing device 130. In yet another embodiment, the interactive computing device 130 hosts server 200, and survey presentation module 230 presents the electronic survey to ridesharing customers by simply displaying the survey on a display of interactive computing device 130.

At block 420, data collection module 240 collects and stores, in database 250, responses to the electronic survey for the plurality of ridesharing trips (see survey responses 270 in FIG. 2). As discussed above, in some embodiments server 200, including data collection module 240, is separate from rideshare vehicle 100 and is located remotely from rideshare vehicle 100. In other embodiments, server 200, including data collection module 240, is integrated with rideshare vehicle 100.

The proposed interior design can be modified based, at least in part, on the responses to the electronic survey. For example, features of the proposed interior design such as seat characteristics, legroom, headroom, human-machine-interface (HMI) features, accessories, video-system features, or audio-system features can be modified (improved) based on the feedback in the responses to the electronic survey.

Figure 5:
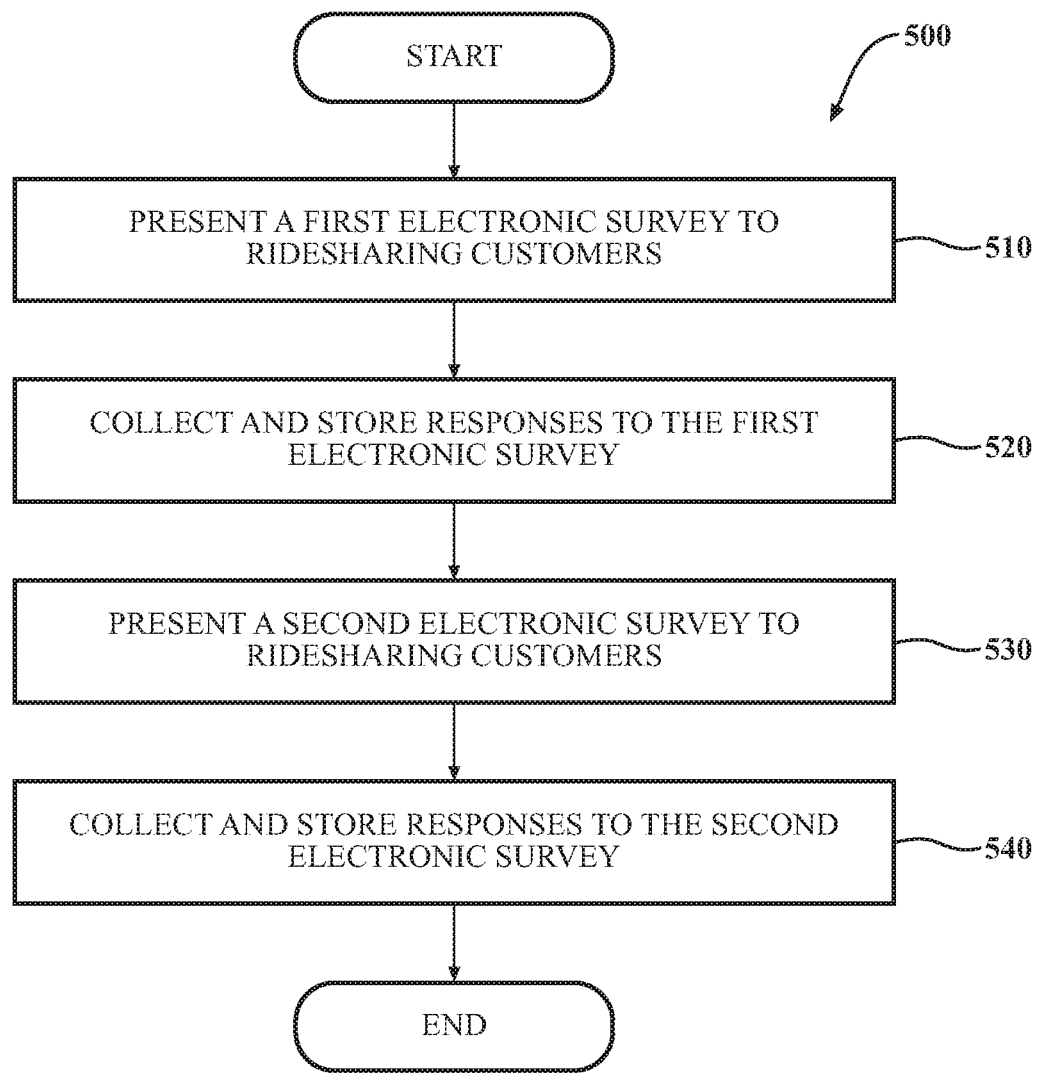
FIG. 5 is a flowchart of a method of improving an interior design of a vehicle under development, in accordance with another illustrative embodiment of the invention.

FIG. 5 is a flowchart of a method 500 of improving an interior design of a vehicle under development, in accordance with another illustrative embodiment of the invention. Method 500 will be discussed from the perspective of server 200 in FIG. 2. While method 500 is discussed in combination with server 200, it should be appreciated that method 500 is not limited to being implemented using server 200, but server 200 is instead one example of a system that may implement method 500.

At block 510, survey presentation module 230 presents a first electronic survey to ridesharing customers from a first plurality of ridesharing trips in a rideshare vehicle 100 having a reconfigurable interior that is configured in accordance with a first proposed interior design for a vehicle under development. The presented first electronic survey pertains to one or more features of the first proposed interior design.

At block 520, data collection module 240 collects and stores, in a computer memory such as database 250, responses to the first electronic survey for the first plurality of ridesharing trips, as described above.

At block 530, survey presentation module 230 presents a second electronic survey to ridesharing customers from a second plurality of ridesharing trips in the rideshare vehicle 100 after the reconfigurable interior of the rideshare vehicle 100 has been reconfigured in accordance with a second proposed interior design for the vehicle under development. The second electronic survey pertains to one or more features of the second proposed interior design.

At block 540, data collection module 240 collects and stores, in a computer memory such as database 250, responses to the second electronic survey for the second plurality of ridesharing trips, as described above.

A third proposed interior design for the vehicle under development can be created based, at least in part, on a comparison of the responses to the first electronic survey with the responses to the second electronic survey. As explained above, in some embodiments, the third proposed interior design may ultimately end up being the same as either the first or second proposed interior design, if one of those designs is preferred over the other without further modification. In other embodiments, the third proposed interior design is a modified version of either the first or second proposed interior design. In still other embodiments, the third proposed interior design is a synthesis (combination) of the first and second proposed interior designs, the best features being adopted from each, based on the survey responses.

Figure 6:
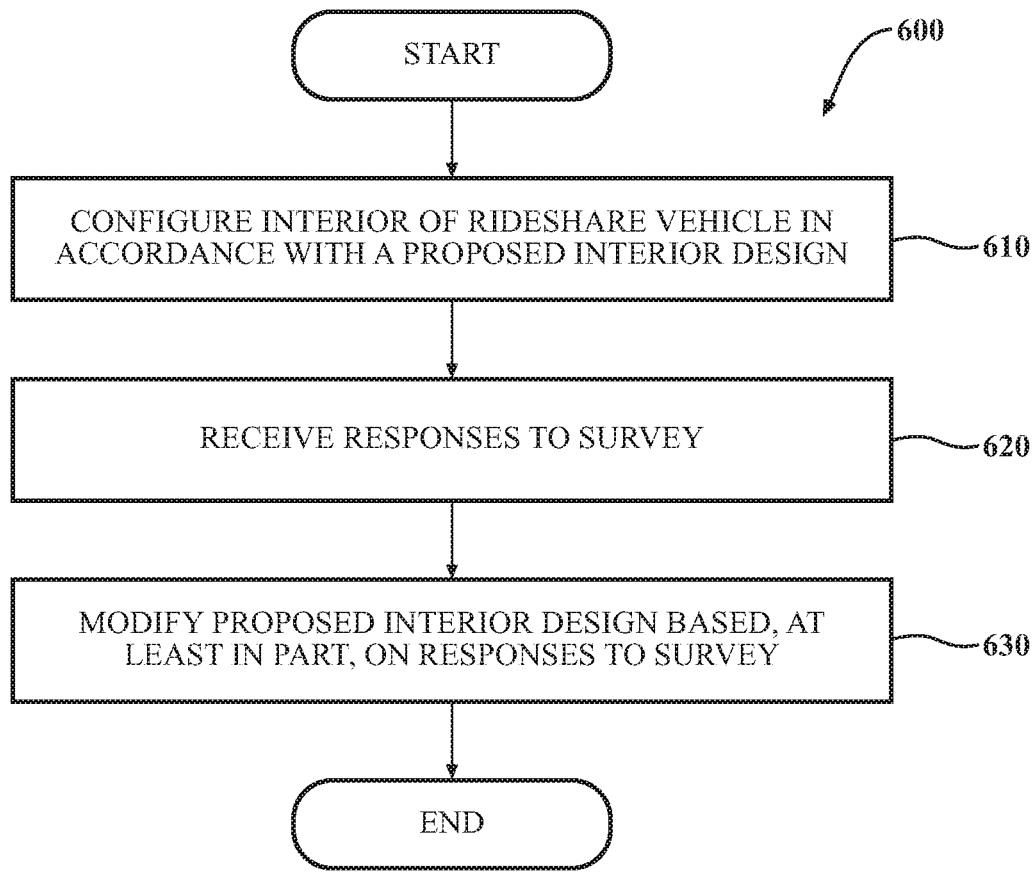
FIG. 6 is a flowchart of a method of improving an interior design of a vehicle under development, in accordance with an illustrative embodiment of the invention.

FIG. 6 is a flowchart of a method 600 of improving an interior design of a vehicle under development, in accordance with an illustrative embodiment of the invention. Method 600 will be discussed from the perspective of server 300 in FIG. 3. While method 600 is discussed in combination with server 300, it should be appreciated that method 600 is not limited to being implemented using server 300, but server 300 is instead one example of a system that may implement method 600.

At block 610, the reconfigurable interior of rideshare vehicle 100 is configured in accordance with a proposed interior design for a vehicle under development. As discussed above, the configuring can be performed by one or more human workers, or the process can be automated in part or in its entirety (e.g., through robotics or specialized mechanisms), depending on the embodiment.

At block 620, data acquisition module 330 receives responses to a survey presented to ridesharing customers from a plurality of ridesharing trips in the rideshare vehicle 100. The survey pertains to one or more features of the proposed interior design for a vehicle under development, as discussed above. The survey responses 370 may be received from, e.g., server 200 discussed above in connection with FIG. 2.

At block 630, the proposed interior design for the vehicle under development is modified based, at least in part, on the responses to the survey. As discussed above, in some embodiments, the proposed interior design is modified by one or more human workers. In other embodiments, the modification process can be at least partially automated through, for example, machine-learning techniques, predetermined vehicle-interior-design heuristics, or both. In those embodiments, server 300 includes interior design module 340, which is involved in modifying the proposed interior design based, at least in part, on the responses to the survey, as discussed above.

Figure 7:
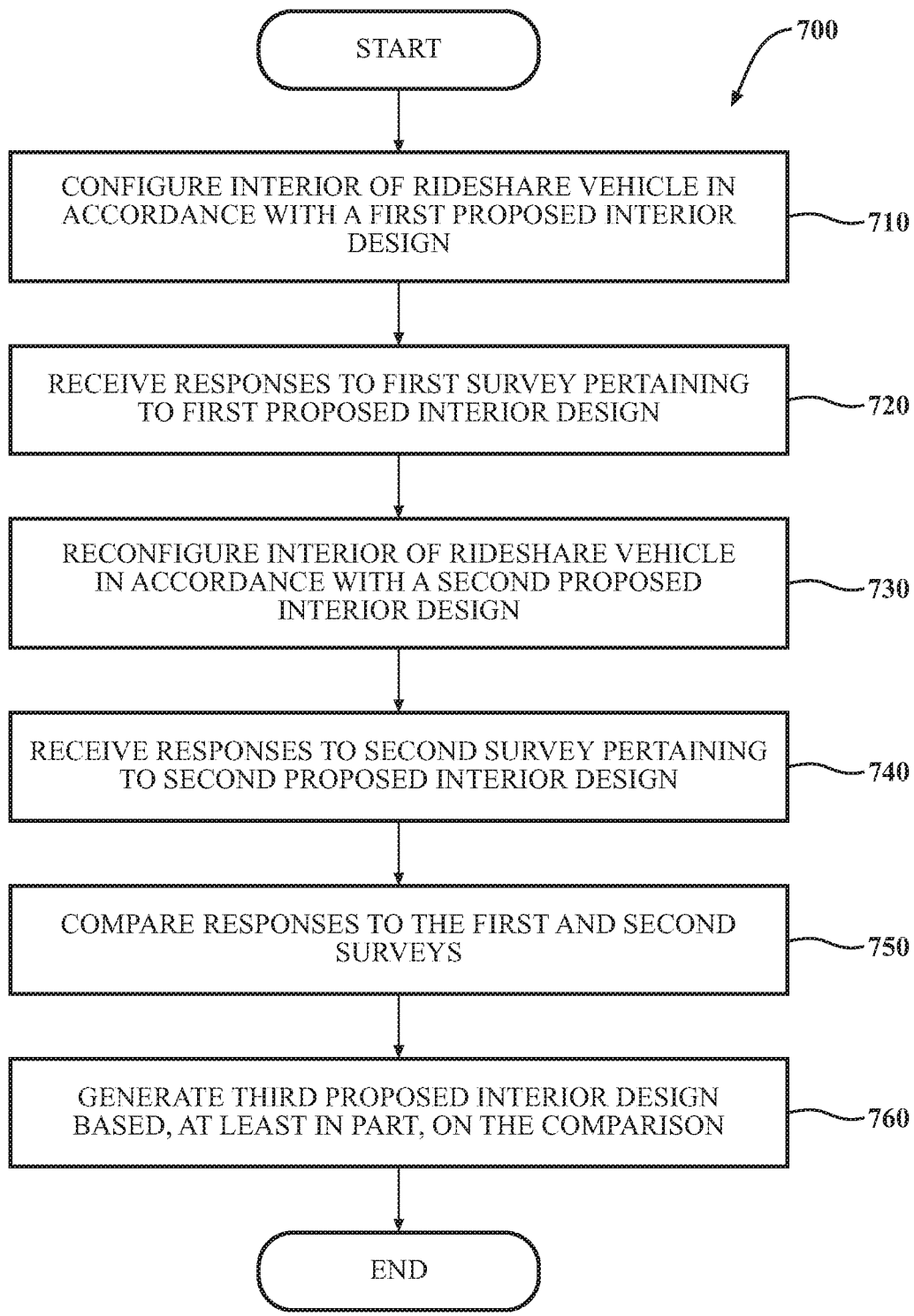
FIG. 7 is a flowchart of a method of improving an interior design of a vehicle under development, in accordance with another illustrative embodiment of the invention.

FIG. 7 is a flowchart of a method 700 of improving an interior design of a vehicle under development, in accordance with another illustrative embodiment of the invention. Method 700 will be discussed from the perspective of server 300 in FIG. 3. While method 700 is discussed in combination with server 300, it should be appreciated that method 700 is not limited to being implemented using server 300, but server 300 is instead one example of a system that may implement method 700.

At block 710, the reconfigurable interior of rideshare vehicle 100 is configured in accordance with a first proposed interior design for a vehicle under development. As discussed above, the configuring can be performed by one or more human workers, or the process can be automated in part or in its entirety (e.g., through robotics or specialized mechanisms), depending on the embodiment.

At block 720, data acquisition module 330 receives responses to a first survey presented to ridesharing customers from a first plurality of ridesharing trips in the rideshare vehicle 100. The first survey pertains to one or more features of the first proposed interior design of a vehicle under development, as discussed above. The survey responses 370 to the first survey may be received from, e.g., server 200 discussed above in connection with FIG. 2.

At block 730, the reconfigurable interior of rideshare vehicle 100 is reconfigured in accordance with a second proposed interior design for the same vehicle under development. As discussed above, this reconfiguring can be performed by one or more human workers, or the process can be automated in part or in its entirety (e.g., through robotics or specialized mechanisms), depending on the embodiment.

At block 740, data acquisition module 330 receives responses to a second survey presented to ridesharing customers from a second plurality of ridesharing trips in the rideshare vehicle 100. The second survey pertains to one or more features of the second proposed interior design for the same vehicle under development, as discussed above. The survey responses 370 to the second survey may be received from, e.g., server 200 discussed above in connection with FIG. 2.

At block 750, interior design module 340 and/or one or more human workers compare the responses to the first survey with the responses to the second survey. At block 760, interior design module 340 and/or one or more human workers generate a third proposed interior design for the vehicle under development based, at least in part, on the comparison of the results of the first and second surveys at block 750. As explained above, in some embodiments, the third proposed interior design may ultimately end up being the same as either the first or second proposed interior design, if one of those designs is preferred over the other without further modification. In other embodiments, the third proposed interior design is a modified version of either the first or second proposed interior design. In still other embodiments, the third proposed interior design is a synthesis (combination) of the first and second proposed interior designs, the best features being adopted from each, based on the survey responses.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A system for improving an interior design of a vehicle under development, the system comprising:
   one or more processors; and
   a memory communicably coupled to the one or more processors and storing:
   a survey presentation module including instructions that when executed by the one or more processors cause the one or more processors to present a first survey to ridesharing customers from a first plurality of ridesharing trips in a rideshare vehicle having a reconfigurable interior that is configured in accordance with a first proposed interior design for the vehicle under development, wherein the first survey pertains to one or more features of the first proposed interior design; and
   a data collection module including instructions that when executed by the one or more processors cause the one or more processors to collect and store responses to the first survey for the first plurality of ridesharing trips;
   wherein the first proposed interior design is automatically modified based, at least in part, on the responses to the first survey using at least one of machine-learning techniques and predetermined vehicle-interior-design heuristics.

2. The system of claim 1, wherein:
   the survey presentation module includes further instructions that, when executed by the one or more processors after the reconfigurable interior has been reconfigured in accordance with a second proposed interior design for the vehicle under development, cause the one or more processors to present a second survey to ridesharing customers from a second plurality of ridesharing trips in the rideshare vehicle, the second survey pertaining to one or more features of the second proposed interior design;
   the data collection module includes further instructions that when executed by the one or more processors cause the one or more processors to collect and store responses to the second survey for the second plurality of ridesharing trips; and
   a third proposed interior design for the vehicle under development is created based, at least in part, on a comparison of the responses to the first survey with the responses to the second survey.

3. The system of claim 1, wherein the one or more features of the first proposed interior design include at least one of seat characteristics, legroom, headroom, a human-machine-interface (HMI) feature, accessories, a video-system feature, and an audio-system feature.

4. The system of claim 1, wherein the vehicle under development is distinct from the rideshare vehicle.

5. The system of claim 1, wherein the instructions in the survey presentation module to present the first survey to ridesharing customers from the first plurality of ridesharing trips in the rideshare vehicle include instructions to transmit the first survey to mobile devices associated with the respective ridesharing customers.

6. The system of claim 1, wherein the instructions in the survey presentation module to present the first survey to ridesharing customers from the first plurality of ridesharing trips in the rideshare vehicle include instructions to display the first survey on an interactive computing device installed in the rideshare vehicle.

7. The system of claim 1, wherein the one or more processors and the memory are part of a server that is separate from the rideshare vehicle.

8. The system of claim 1, wherein the one or more processors and the memory are part of a server that is integrated with the rideshare vehicle.

9. The system of claim 1, wherein the first survey includes a plurality of questions directed to gauging customer satisfaction with the one or more features of the first proposed interior design.

10. A method of improving an interior design of a vehicle under development, the method comprising:
    presenting a first electronic survey to ridesharing customers from a first plurality of ridesharing trips in a rideshare vehicle having a reconfigurable interior that is configured in accordance with a first proposed interior design for the vehicle under development, the first electronic survey pertaining to one or more features of the first proposed interior design; and
    collecting and storing, in a computer memory, responses to the first electronic survey for the first plurality of ridesharing trips;
    wherein the first proposed interior design is automatically modified based, at least in part, on the responses to the first survey using at least one of machine-learning techniques and predetermined vehicle-interior-design heuristics.

11. The method of claim 10, further comprising:
    presenting a second electronic survey to ridesharing customers from a second plurality of ridesharing trips in the rideshare vehicle after the reconfigurable interior of the rideshare vehicle has been reconfigured in accordance with a second proposed interior design for the vehicle under development, wherein the second electronic survey pertains to one or more features of the second proposed interior design; and collecting and storing, in the computer memory, responses to the second electronic survey for the second plurality of ridesharing trips;

wherein a third proposed interior design for the vehicle under development is created based, at least in part, on a comparison of the responses to the first electronic survey with the responses to the second electronic survey.

12. The method of claim 10, wherein the one or more features of the first proposed interior design include at least one of seat characteristics, legroom, headroom, a human-machine-interface (HMI) feature, accessories, a video-system feature, and an audio-system feature.

13. The method of claim 10, wherein the vehicle under development is distinct from the rideshare vehicle.

14. The method of claim 10, wherein presenting the first electronic survey to ridesharing customers from the first plurality of ridesharing trips in the rideshare vehicle includes transmitting the first electronic survey to mobile devices associated with the respective ridesharing customers.

15. The method of claim 10, wherein presenting the first electronic survey to ridesharing customers from the first plurality of ridesharing trips in the rideshare vehicle includes displaying the first electronic survey on an interactive computing device installed in the rideshare vehicle.

16. The method of claim 10, wherein the collecting and storing responses to the first electronic survey for the first plurality of ridesharing trips includes receiving the responses to the first electronic survey at a server that is separate from the rideshare vehicle.

17. The method of claim 10, wherein the collecting and storing responses to the first electronic survey for the first plurality of ridesharing trips includes receiving the responses to the first electronic survey at a server that is integrated with the rideshare vehicle.

18. The method of claim 10, wherein the first electronic survey includes a plurality of questions directed to gauging customer satisfaction with the one or more features of the first proposed interior design.

19. A method of improving an interior design of a vehicle under development, the method comprising:

configuring a rideshare vehicle having a reconfigurable interior in accordance with a first proposed interior design for the vehicle under development;

receiving responses to a first survey presented to ridesharing customers from a first plurality of ridesharing trips in the rideshare vehicle, the first survey pertaining to one or more features of the first proposed interior design; and modifying the first proposed interior design automatically based, at least in part, on the responses to the first survey using at least one of machine-learning techniques and predetermined vehicle-interior-design heuristics.

20. The method of claim 19, further comprising:

reconfiguring the reconfigurable interior in accordance with a second proposed interior design for the vehicle under development;

receiving responses to a second survey presented to ridesharing customers from a second plurality of ridesharing trips in the rideshare vehicle, the second survey pertaining to one or more features of the second proposed interior design;

performing a comparison between the responses to the first survey and the responses to the second survey; and generating a third proposed interior design for the vehicle under development based, at least on part, on the comparison.

* * * * *